US006435589B2

(12) United States Patent
Shimizu et al.

(10) Patent No.: US 6,435,589 B2
(45) Date of Patent: Aug. 20, 2002

(54) VEHICULAR SEAT SUPPORT STRUCTURE

(75) Inventors: Hirotsugu Shimizu, Anjo; Tatsuo Harada, Toyota, both of (JP)

(73) Assignee: Araco Kabushiki Kaisha, Toyota (JP)

( * ) Notice: Subject to any disclaimer, the term of this patent is extended or adjusted under 35 U.S.C. 154(b) by 0 days.

(21) Appl. No.: 09/791,639

(22) Filed: Feb. 26, 2001

(30) Foreign Application Priority Data

Feb. 28, 2000 (JP) ............................................. 2000-51602

(51) Int. Cl.[7] ................................................. B60N 2/02
(52) U.S. Cl. ............................... 296/65.09; 296/65.05; 297/15; 297/334
(58) Field of Search .......................... 296/65.01, 65.05, 296/65.08, 65.09, 65.16; 297/15, 334, 336; 248/421

(56) References Cited

U.S. PATENT DOCUMENTS

| 3,227,488 | A | * | 1/1966 | Kosbab et al. ............ 296/65.06 |
| 5,269,581 | A | | 12/1993 | Odagaki et al. |
| 5,868,451 | A | * | 2/1999 | Uno et al. ................ 296/65.05 |
| 5,890,758 | A | * | 4/1999 | Pone et al. ..................... 296/66 |
| 5,975,612 | A | * | 11/1999 | Macey et al. ............. 296/65.05 |
| 6,106,046 | A | * | 8/2000 | Reichel ....................... 296/37.2 |
| 6,231,101 | B1 | * | 5/2001 | Kamida et al. ................ 296/63 |
| 6,318,784 | B2 | * | 11/2001 | Nishide .................... 296/65.09 |
| 2001/0002759 | A1 | * | 6/2001 | Nishide .................... 296/65.09 |
| 2001/0026075 | A1 | * | 10/2001 | Shimizu et al. .......... 296/65.06 |
| 2001/0052718 | A1 | * | 12/2001 | Sugiura et al. ................ 297/15 |

* cited by examiner

Primary Examiner—Stephen T. Gordon
Assistant Examiner—Patricia Engle
(74) Attorney, Agent, or Firm—Oliff & Berridge PLC

(57) ABSTRACT

The vehicular seat support mechanism includes a vehicular seat having a seat cushion that forms a sitting portion, the seat cushion having a pivot axis, which is horizontal with respect to the width direction of a vehicle, provided toward the rear thereof, which enables the seat cushion to pivot in a fore-and-aft direction of a vehicle, and a link mechanism that moves the pivot axis of the seat cushion to rear and downward. This support mechanism reduces the height of the pivoting locus of the seat drawn when the seat is placed into storage, thus allowing the seat to be pivoted into storage without requiring a large space.

23 Claims, 6 Drawing Sheets

VEHICULAR SEAT SUPPORT STRUCTURE

INCORPORATION BY REFERENCE

The disclosure of Japanese Patent Application No. 2000-51602 filed on Feb. 28, 2000 including the specification, drawings and abstract is incorporated herein by reference in its entirety.

BACKGROUND OF THE INVENTION

1. Field of the Invention

The invention relates to a vehicular seat support structure for supporting a vehicular seat.

2. Description of Related Art

One type of existing vehicular seat support mechanism supports a rear end portion of a seat cushion of a vehicular seat at a forward side of a storage recess formed in a compartment floor in such a manner that the seat cushion is pivotal in fore-and-aft directions. This mechanism functions so that the vehicular seat can be placed into the storage recess by pivoting the seat rearwards, with the seatback placed down over the seat cushion.

This support mechanism, as described in Japanese Utility Model Registration No. 2594404 (U.S. Pat. No. 5,269,581), includes a pair of right and left-side bars and a pair of right and left-side mounting brackets. The right and left-side bars are provided on right and left-side edge portions of a forward portion of the storage recess, which are protruded inwards in the storage recess. The right and left-side bars form a pivot of a seat cushion and a seatback. The right and left-side mounting brackets are provided at right and left-side sites in a rear end portion of the seat cushion. The mounting brackets are supported by the right and left-side bars so that the brackets are pivotal in the fore-and-aft directions. In this manner, the rear end portion of the seat cushion is supported pivotally in the fore-and-aft directions.

SUMMARY OF THE INVENTION

Accordingly, it is an object of the invention to provide a support mechanism for a vehicular seat that has improved operability in placing the vehicular.

The invention relates to a vehicular seat support mechanism. The vehicular seat support mechanism includes a vehicular seat having a seat cushion that forms a sitting portion, the seat cushion having a pivot axis, which is horizontal with respect to the width direction of a vehicle, provided toward the rear thereof, which enables the seat cushion to pivot in a fore-and-aft direction of a vehicle, and a link mechanism that moves the pivot axis of the seat cushion to rear and downward.

The support mechanism may support a rear end portion of a seat cushion forming a vehicular seat at a site forward of a storage recess portion provided in the compartment floor, in such a manner that the seat cushion is pivotal in fore-and-aft directions. The support mechanism may further functions to allow the vehicular seat to be placed into the storage recess portion by pivoting the seat rearward.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
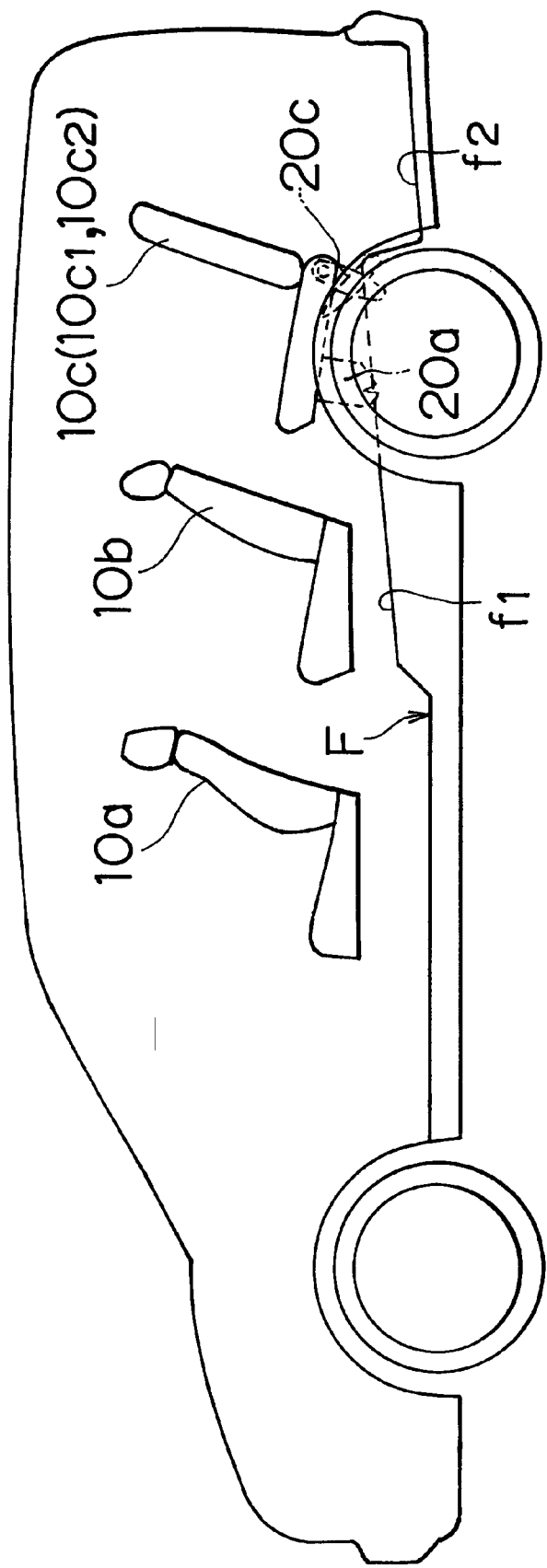
FIG. 1 is a schematic diagram of a vehicle equipped with a rear seat that is supported by adopting support mechanisms in accordance with an embodiment of the invention.
Figure 2:
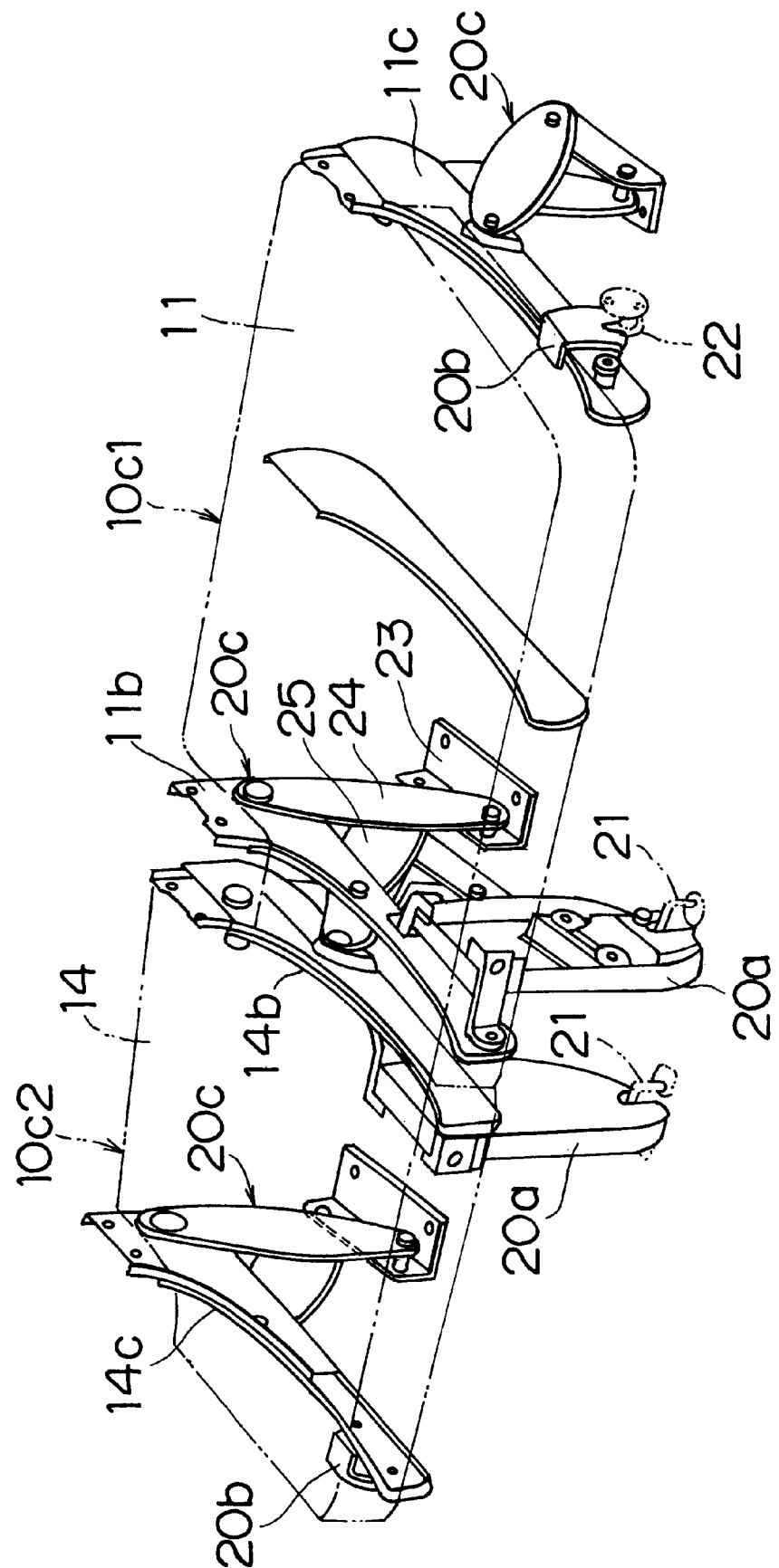
FIG. 2 is a partially cut-away perspective view illustrating a state in which each seat cushion forming the rear seat is supported.

The invention will be described hereinafter with reference to the accompanying drawings. FIG. 1 schematically illustrates a vehicle equipped with a rear seat that is supported by adopting a support mechanism in accordance with a preferred embodiment of the invention. The vehicle has a three-row seat arrangement in which three rows of seats are displaced in the fore-and-aft directions. That is, the vehicle has a firstrow seat (front seat 10a), a second-row seat 10b, and a third-row seat (rear seat 10c). The rear seat 10c has three sitting portions that are arranged in the right-and-left direction. As illustrated in FIG. 2, the rear seat 10c is divided at a proportion of 6:4 in the right-and-left direction into a left-side seat 10c1 and a right-side seat 10c2. The left-side seat 10c1 and the right-side seat 10c2, forming the rear seat 10c, are supported at their rear end portions to a floor F by support mechanisms in accordance with an embodiment of the invention.

Figure 3:
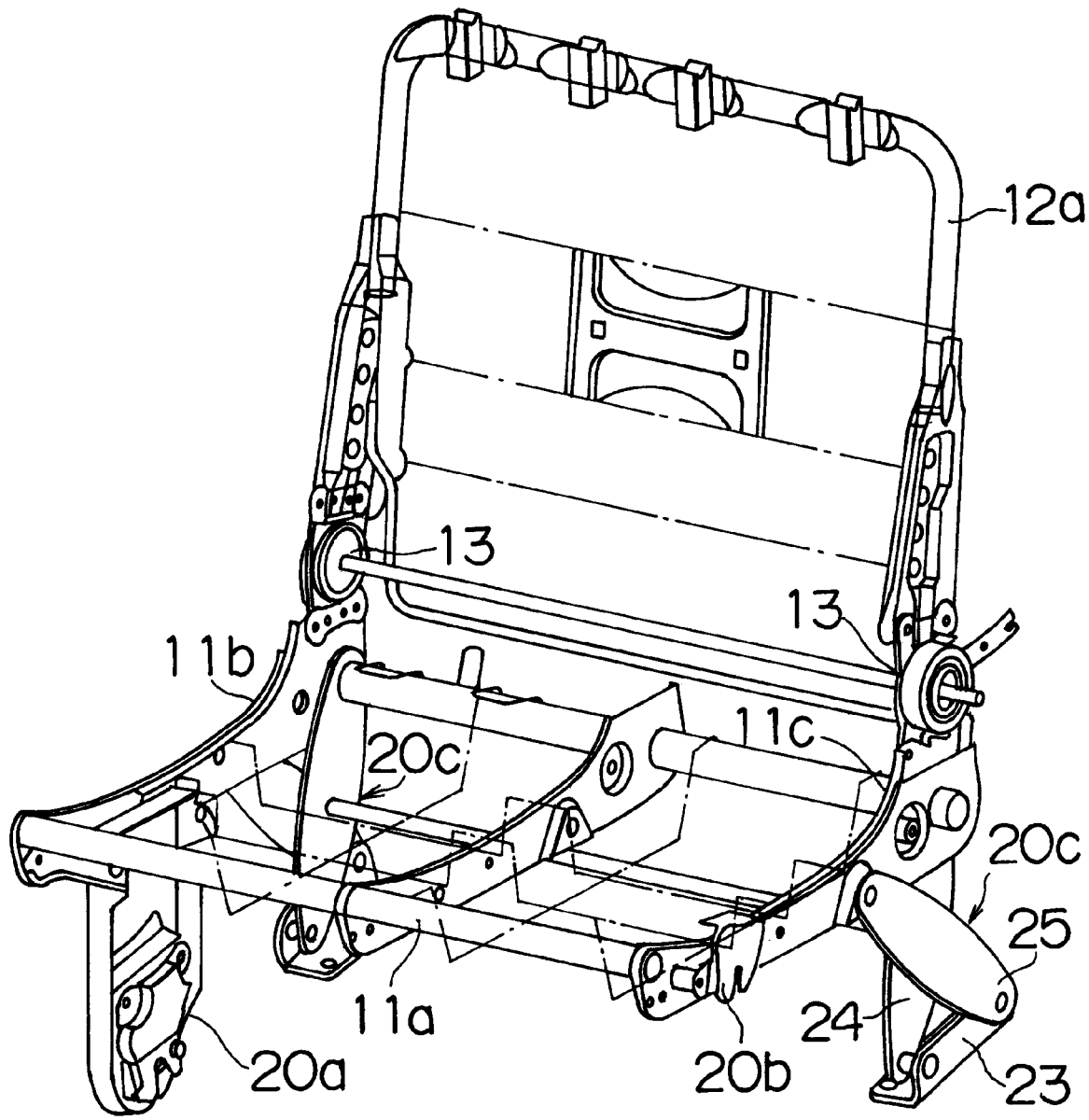
FIG. 3 is a perspective view illustrating a seat frame structure of a left-side seat of the rear seat, and support mechanisms attached to the seat frame structure.

The left-side seat 10c1 has a seat cushion 11 and a seatback 12. As shown in FIG. 3, a seatback frame 12a of the seatback 12 is connected at its lower end portion to a rear end portion of a cushion frame 11a of the seat cushion 11 via a reclining mechanism 13. During a normal state, the seatback 12 is set in an upright position. At the time of storage, the locking of the seat cushion 11 and the seatback 12 established by the reclining mechanism 13 is removed (unlocked), and the seatback 12 is pivoted down until a front surface of the seatback 12 contacts an upper surface of the seat cushion 11. Thus, the seatback 12 assumes a state where the seatback 12 is placed over the seat cushion 11. The right-side seat 10c2 has a seat cushion 14 and a seatback (not shown), and is constructed similarly to the left-side seat 10c1. Each of the seat cushion 11 forming the left-side seat 10c1 and the seat cushion 14 forming the right-side seat 10c2 is supported to the floor F by a forward lock mechanism 20a, a side lock mechanism 20b, and a pair of right and left-side rearward support mechanisms 20c.

The forward lock mechanisms 20a are attached to forward end portions of inner lower arms 11b, 14b of the seat cushions 11, 14 via connecting portions so that the forward lock mechanisms 20a are pivotal in the right-and-left directions. As shown in FIG. 3, the seatback 12 is held to the seat cushion 11 in an upright state by the reclining mechanism 13. The forward lock mechanism 20a is able to establish the seat cushion 11 in a locked state on the floor F by engaging with a corresponding one of strikers 21 provided on the floor F. Furthermore, the forward lock mechanisms 20a are designed so that the forward lock mechanisms 20a can be folded toward a lower-surface side of the seat cushions 11, 14 when the locked state is removed. The side lock mechanisms 20b are attached to forward end portions of outer lower arms 11c, 14c of the seat cushions 11, 14. Each side lock mechanism 20b is positioned on an outer side of a corresponding one of the outer lower arms 11c, 14c as shown in FIG. 2. Each side lock mechanism 20b is designed so as to establish a locked state or an unlocked state by detachably engaging or disengaging with a striker 22 provided on an inward side wall of an adjacent tire housing (not shown) of the vehicle body. Each rearward support mechanism 20c is made up of a mounting bracket 23, a first link 24, and a second link 25.

Figure 4:
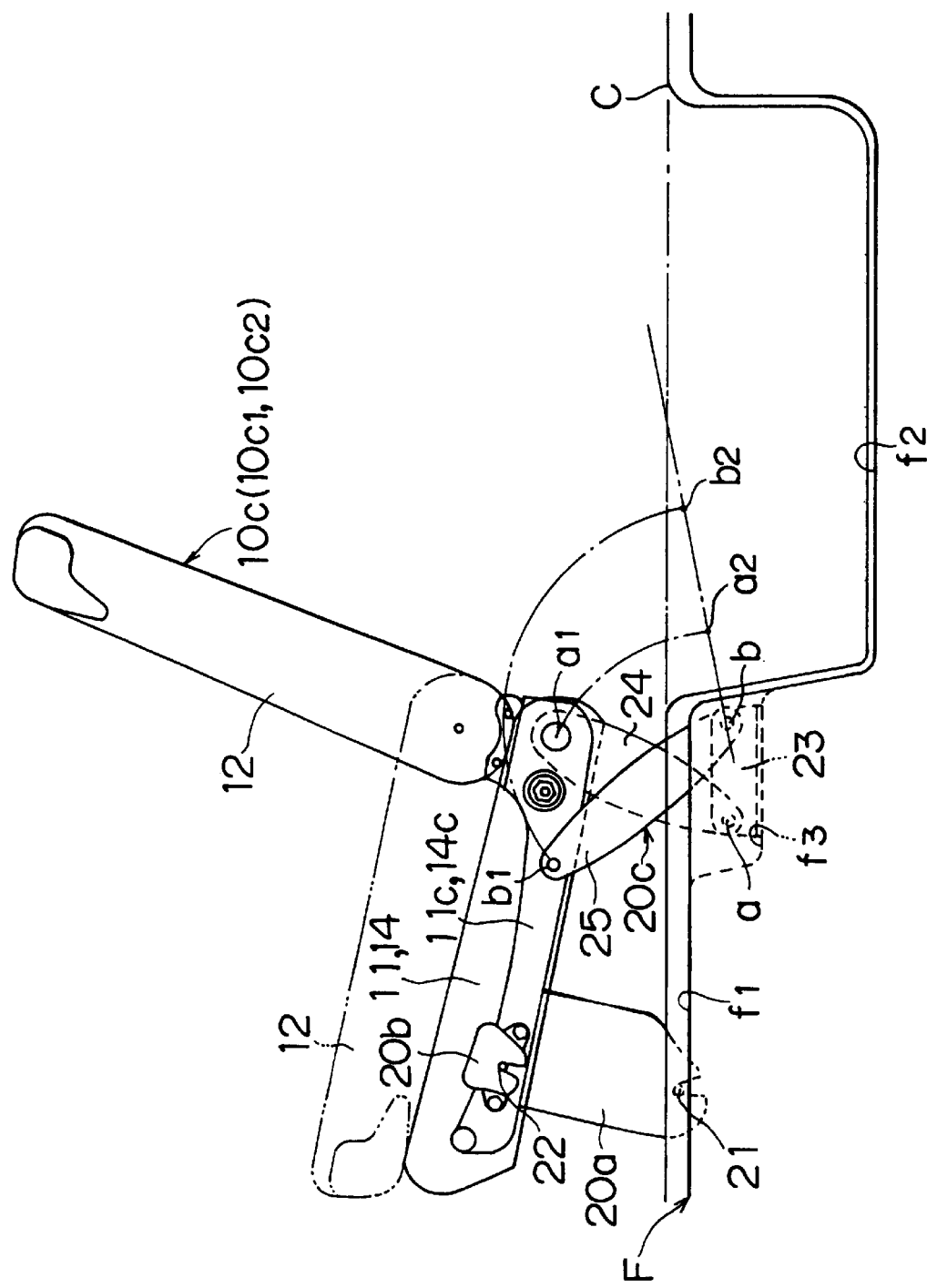
FIG. 4 is a side view of the rear seat supported on a compartment floor.
Figure 5:
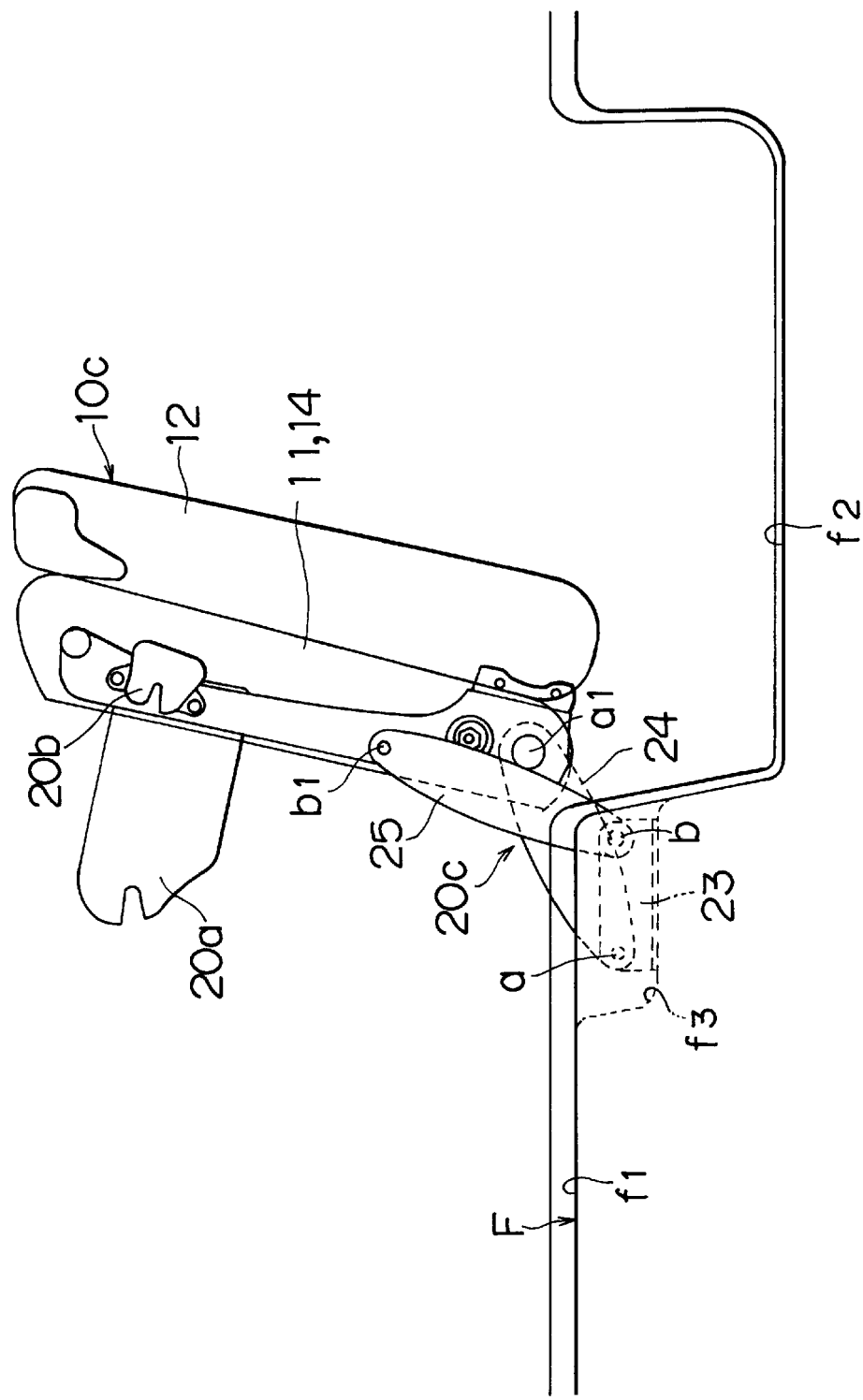
FIG. 5 is a side view in which the rear seat is being placed into storage.
Figure 6:
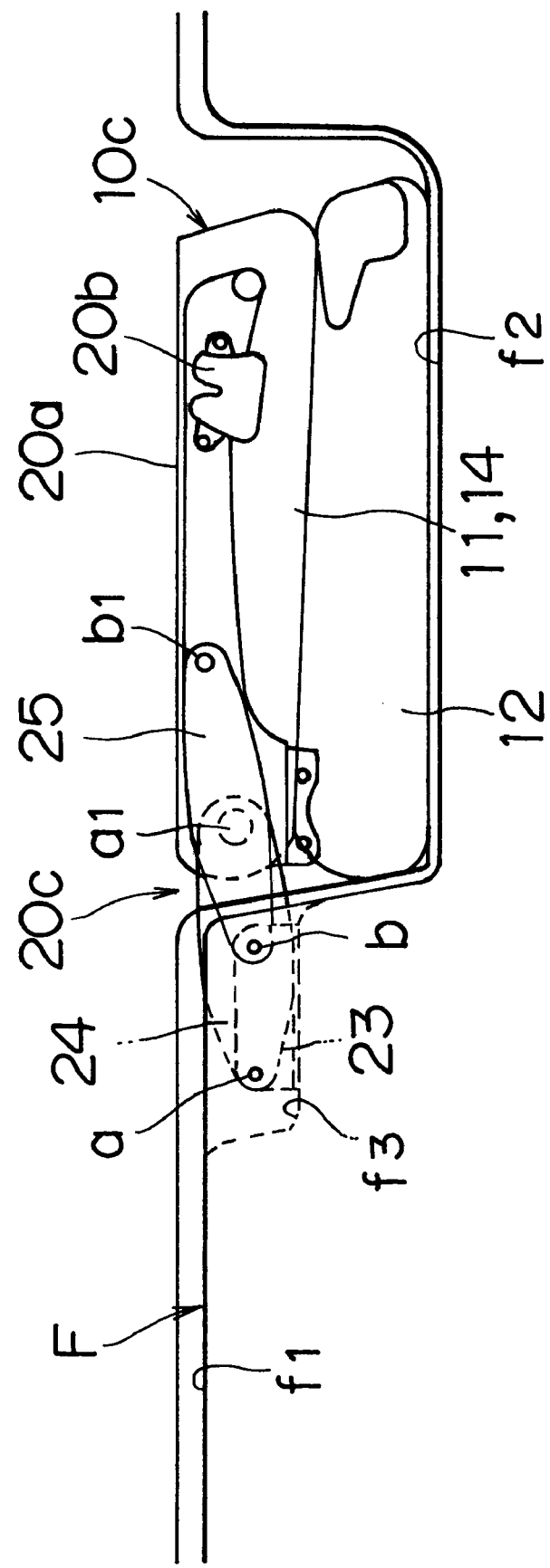
FIG. 6 is a side view in which the rear seat has been placed into storage.

As shown in FIGS. 4 to 6, the compartment floor F has a storage recess f2 that is formed rearward of a main floor portion f1 on which the rear seat 10c is disposed. Mounting recess portions f3 that are lower than the main floor portion f1 are formed at sites forward of the storage recess f2 that correspond to right and left sites in rear end portion of the seat cushions 11, 14. The rearward support mechanisms 20c are disposed on the mounting recess portions f3, respectively. The left-side seat 10c1 and the right-side seat 10c2 are disposed on the main floor portion f1 forward of the storage recess f2. Each of the left-side seat 10c1 and the right-side seat 10c2 is supported by the forward lock mechanism 20a, the side lock mechanism 20b, and the right and left-side rearward support mechanisms 20c. With regard to each rearward support mechanism 20c, the mounting bracket 23 is attached onto the corresponding mounting recess portion f3 of the compartment floor F. In addition, the first link 24 and the second link 25 are connected to the mounting bracket 23 and to the corresponding one of the lower arms 11b, 11c, 14b, 14c of the seat cushion 11, 14. In this vehicle, a carpet C is laid substantially over the enter surface of the compartment floor F.

With regard to the left-side seat 10c1, the mounting bracket 23 of each rearward support mechanism 20c is positioned under a corresponding one of right and left-side sites in a rear end portion of the seat cushion 11. The first link 24 is connected at its lower end portion to a forward portion of the mounting bracket 23 in such a manner that the first link 24 is pivotal in the fore-and-aft directions. The first link 24 extends rearwardly upwards in an inclined state. An upper end portion of the first link 24 is connected to the corresponding one of the lower arms 11b, 11c of the seat cushion 11 in such a manner that the first link 24 is pivotal in the fore-and-aft directions. The second link 25 is connected at its lower end portion to a site of the mounting bracket 23 that is rearward of the site of connection to the first link 24, in such a manner that the second link 25 is pivotal in the fore-and-aft aft directions. The second link 25 extends forwardly upwards in an inclined state, crossing the first link 24. An upper end portion of the second link 25 is connected to a site in the rear end portion of the corresponding one of the lower arms 11b, 11c of the seat cushion 11 that is forward of the site at which the first link 24 is connected to the rear end portion of the lower arm, in such a manner that the second link 25 is pivotal in the fore-and-aft directions. In the above-described state, the right and left-side rearward support mechanisms 20c support the rear end portions of the seat cushion 11 at the right and left-side sites.

With regard to the right-side seat 10c2, the mounting bracket 23 of each rearward support mechanism 20c is positioned under a corresponding one of right and left-side sites in a rear end portion of the seat cushion 14. The first link 24 is connected at its lower end portion to a forward portion of the mounting bracket 23 in such a manner that the first link 24 is pivotal in the fore-and-aft directions. The first link 24 extends rearwardly upwards in an inclined state. An upper end portion of the first link 24 is connected to the corresponding one of the lower arms 14b, 14c of the seat cushion 14 in such a manner that the first link 24 is pivotal in the fore-and-aft directions. The second link 25 is connected at its lower end portion to a site in the mounting bracket 23 that is rearward of the site of connection to the first link 24, in such a manner that the second link 25 is pivotal in the fore-and-aft directions. The second link 25 extends forwardly upwards in an inclined state, crossing the first link 24. An upper end portion of the second link 25 is connected to a site in the rear end portion of the corresponding one of the lower arms 14b, 14c of the seat cushion 14 that is forward of the site at which the first link 24 is connected to the rear end portion of the lower arm, in such a manner that the second link 25 is pivotal in the fore-and-aft directions. In the above-described state, the right and left-side support mechanisms 20 support the rear end portions of the seat cushion 14 at the right and left-side sites.

The left-side seat 10c1 and the right-side seat 10c2 supported to the compartment floor F as described above can be placed into the storage recess f2 independently of each other when necessary. When placed into storage recess f2, a space is formed, which can be used as a luggage compartment, over the site on the main floor portion f1 for disposing the left-side seat 10c1 and the right-side seat 10c2 and over the storage recess f2, thereby forming a large luggage compartment rearward of the second-row row seat 10b. It should be noted that the manner of placing the left-side seat 10c1 into the storage recess f2 and the manner of placing the right-side seat 10c2 into the storage recess f2 are substantially the same. Therefore, the following description of the manner of placing the seats into the storage recess f2 will be made by referring to the left-side seat 10c1 and the right-side seat 10c 2 collectively as the rear seat 10a for the sake of convenience in description.

FIGS. 4 to 6 illustrate a process of placing the rear seat 10c (the left-side seat 10a1 and/or the right-side seat 10c2) into the storage recess f2. During a normal seat state of the rear seat 10c as shown in FIG. 4, each seat cushion 11, 14 is supported on the compartment floor F by the forward lock mechanism 20a and the right and left-side rearward support mechanisms 20c, and the seat cushion is further supported on the inner side wall of the adjacent tire housing (not shown) by the side lock mechanism 20b.

To place the rear seat 10c from this state into the storage recess f2, the locked state of each seat cushion 11, 14 retained by the forward lock mechanism 20a and the side lock mechanism 20b with respect to the compartment floor F and the inner side wall of the tire housing, respectively, is removed. Furthermore, the locked state of the seatback 12 retained by the reclining mechanism 13 with respect to the seat cushion 11, 14 is removed (unlocked), and then the seatback 12 is placed down over the seat cushion 11, 14. Thus, the rear seat 10c is set in a folded state.

Then, the rear seat 10c is pivoted rearward as indicated in FIG. 5 by raising a forward end portion of the rear seat 10c while maintaining the folded state where the seatback 12 is placed on the seat cushion 11, 14. The rear seat 10c is thus placed into the storage recess f2 rearward of the site for disposing the rear seat 10c. When the rear seat 10c has been placed into the storage recess f2 while the folded state is maintained, the lower surface of the seat cushions 11, 14 is at an upper position and the forward lock mechanisms 20a are protruded upwards. Therefore, the forward lock mechanisms 20a are subsequently pivoted down onto the seat cushions 11, 14. Thus, the rear seat 10c is stored as shown in FIG. 6, so that the site in the compartment floor F for disposing the rear seat 10c and the opening portion of the storage recess form an integral flat surface, thereby forming a large luggage compartment in the vehicle. The rear seat 10c can be returned from the storage recess f2-stored state to the normal seat state by reversing the above-described procedure.

Thus, the rear seat 10c, in which each seat cushion 11, 14 is supported at the right and left-side sites in the rear end portion thereof by the right and left-side rearward support mechanisms 20c, is placed into the storage recess f2 as described above, so that the rear seat disposing site in the main floor portion f1 in the compartment floor F and the opening portion of the storage recess f2 form an integral flat surface, thereby forming a large luggage compartment. During the process of placing the folded rear seat 10c into storage, each rearward support mechanism 20c turns along arcshaped loci indicated by one-dot chain lines in FIG. 4 from the normal seat state shown in FIG. 4 to the stored state shown in FIG. 6.

More specifically, the first link 24 of each rearward support mechanism 20c pivots rearwards and downwards about a lower end connecting portion a at which the first link 24 is connected to the mounting bracket 23, so that an upper end connecting portion a1 at which the first link 24 is connected to a corresponding one of the seat cushions 11, 14 is moved to a rearward and downward position a2. The second link 25 pivots rearwards and downwards about a lower end connecting portion b at which the second link 25 is connected to the mounting bracket 23, so that an upper end connecting portion b1 at which the second link 25 is connected to the corresponding one of the seat cushions 11, 14 is moved to a rearward and downward position b2.

Therefore, during the operation of placing the rear seat 10c into storage, the folded rear seat 10c pivots rearward while a rear end portion of the rear seat 10c moves downward gradually, due to the pivoting motion of the first link 24 and the pivoting motion of the second link 25 that follows the pivoting motion of the first link 24. Therefore, the pivoting locus of a distal end portion of the folded rear seat 10c forms an elliptic shape whose pivot center is lower than that of a circular locus of a pivoting motion (circular motion) about a single pivot, and whose height is less than that of the circular locus.

The rear end portion of the rear seat 10c moves to the rear and downward gradually because the pivoting motion of the support mechanisms 20c is not the pivoting motion forming circular motion about a single pivot like the conventional support mechanism. Therefor, an area of the pivoting motion is small in comparison with the conventional support mechanism. Furthermore, the pivot axis of the rear seat 10c becomes lower so that the up-down movements of the center of gravity of the rear seat 10c becomes less. Therefore, the labor required for the storing operating is reduced. Furthermore, since each support mechanism 20c supports the rear end portion of a corresponding one of the seat cushions 11, 14 using the first link 24 and the second link 25 crossing each other, the supporting mechanism 20c has a sufficient effect of anchor when a seat belt is adopted to the rear seat. Furthermore, the support mechanisms 20c have sufficient support strength enough to absorb an impactive force in a fore-and-aft directions of the vehicle.

Thus, the support mechanisms 20c are effective at supporting the rear seat 10c made up of a plurality of seats divided in the right-and-left directions (the left-side seat 10c1 and the right-side seat 10c2). The rearward support mechanisms 20c can be adopted not only as support mechanisms for supporting an elongated bench type seat having a plurality of sitting portions arranged in the right-and-left directions, but also as support mechanisms for supporting a seat having a single sitting portion.

Although in the foregoing embodiment, the support mechanism of the invention is adopted for the rearmost seat (third-row seat) in a vehicle having a three-row seat arrangement, the support mechanism of the invention is not limited to that embodiment, but may also be adopted for the second-row seat in a vehicle having a two-row seat arrangement. In such a case, the support mechanism of the invention achieves substantially the same advantages as those achieved by the foregoing embodiment.

Furthermore, the mounting bracket 23 of each rearward support mechanism 20c is disposed in the mounting recess portion f3 that is lower than the main floor portion f1 of the compartment floor F. Therefore, when the rear seat 10c is placed into storage, no component member of the rearward support mechanisms 20c protrudes above from the main floor portion f1, so that the site for disposing the rear seat 10c and the storage site altogether form a substantially flat surface, thereby providing a large luggage compartment.

Although in the foregoing embodiment, the support mechanism including two links, for example the first link 24 and the second link 25, is adopted as the vehicular seat support mechanism of the present invention, the vehicular seat support mechanism may be a mechanism such as that the pivot axis moves to either front or rear and downward. The support mechanism of the invention is not limited to that mechanism including two links. If a link mechanism including only the first link 24 is adopted to the support mechanism, the invention achieves substantially the same advantages as those achieved by the foregoing embodiment.

Further, although in the foregoing embodiment, the storage recess f2 is provided toward the rear of the rear seat 10c, the storage recess f2 may be provided toward the front of the rear seat 10c.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular seat support mechanism comprising:

a vehicular seat having a seat cushion that forms a sitting portion, the seat cushion having a pivot axis, which is horizontal with respect to the width direction of a vehicle, which enables the seat cushion to pivot in a fore-and-aft direction of a vehicle; and a mechanism that moves the pivot axis of the seat cushion downward while the seat cushion pivots about the pivot axis, while allowing the seat cushion to invert such that a bottom surface of the seat cushion faces upward once the pivot axis has been moved to a downward position.

2. A vehicular seat support mechanism according to claim 1, wherein:

the pivot axis is a first pivot axis, and the seat cushion further includes a second pivot axis that is spaced from and parallel to the first pivot axis; and the mechanism includes a first link pivotally connected to the first pivot axis and a second link pivotally connected to the second pivot axis.

3. A vehicular seat support mechanism comprising:
- a vehicular seat having a seat cushion that forms a sitting portion, the seat cushion having a pivot axis, which is horizontal with respect to the width direction of a vehicle, which enables the seat cushion to pivot in a fore-and-aft direction of a vehicle;
- a mechanism that moves the pivot axis of the seat cushion downward while the seat cushion pivots about the pivot axis;
- a storage recess that is provided in a compartment floor and that receives the vehicular seat when the vehicular seat is placed into a storage position; and
- a mounting bracket provided at a site in the compartment floor that is forward of the storage recess,
- wherein the mechanism includes a first link having a lower end portion connected to the mounting bracket so that the first link is pivotal in a fore-and-aft direction relative to the mounting bracket, the first link extending rearwardly upward in an inclined state, and having an upper end portion connected to a rear end portion of the seat cushion so that the first link is pivotal in the fore-and-aft direction relative to the seat cushion; and
- a second link having a lower end portion connected to a site of the mounting bracket that is rearward of a site of connection of the mounting bracket to the first link so that the second link is pivotal in the fore-and-aft direction relative to the mounting bracket, the second link extending forwardly upward in an inclined state and crossing the first link, and having an upper end portion connected to a site in the rear end portion of the seat cushion that is forward of a site at which the first link is connected to the rear end portion of the seat cushion, so that the second link is pivotal in the fore-and-aft direction relative to the seat cushion.

4. A support mechanism according to claim 3, wherein the rear end portion of the vehicular seat is pivoted rearward and downward to place the vehicular seat into the storage recess, by a rearward pivoting motion of the first link and a rearward pivoting motion of the second link.

5. A support mechanism according to claim 3, wherein:
- the vehicular seat includes a seatback that is disposed in association with the rear end portion of the seat cushion via a reclining mechanism; and
- the vehicular seat is displaced into a state where the seatback is placed down over the seat cushion when the vehicular seat is placed into the storage recess by pivoting the vehicular seat rearward.

6. A support mechanism according to claim 3, wherein:
- the vehicular seat is a rear seat having a plurality of sitting portions that are arranged in a right-and-left direction; and
- the mounting bracket is provided below the rearward portion of the seat cushion forming the rear seat, and the first link and the second link are connected to the mounting bracket.

7. A support mechanism according to claim 6, wherein there are a plurality of the mounting brackets and associated first and second links, and a first one of the mounting brackets and associated links is provided below a right-side portion of the rear end portion of the seat cushion, and a second one of the mounting brackets and associated links is provided below a left-side portion of the rear end portion of the seat cushion.

8. A support mechanism according to claim 3, wherein the mounting bracket is provided at a site that is lower than the compartment floor.

9. A support mechanism according to claim 8, wherein:
- the vehicular seat is a rear seat having a plurality of seats that are divided in a right-and-left direction; and
- there are a plurality of the mounting brackets and associated first and second links, and at least one of the mounting brackets and associated links is provided below the rear end portion of the seat cushion of each seat forming the rear seat.

10. A support mechanism according to claim 9, wherein one of the mounting brackets and associated links is provided below each one of a right-side portion and a left-side portion of the rear end portion of each seat cushion.

11. A support mechanism according to claim 8, further comprising a mounting recess that is provided at a site that is forward of the storage recess and that is lower than the compartment floor,
- wherein the mounting bracket is disposed in the mounting recess.

12. A support mechanism according to claim 11, wherein:
- the vehicular seat is a rear seat having a plurality of seats that are divided in a right-and-left direction; and
- there are a plurality of the mounting brackets and associated first and second links, and at least one of the mounting brackets and associated links is provided below the rear end portion of the seat cushion of each seat forming the rear seat.

13. A support mechanism according to claim 12, wherein one of the mounting brackets and associated links is provided below each one of a right-side portion and a left-side portion of the rear end portion of each seat cushion.

14. A support mechanism according to claim 3, wherein the storage recess has a depth such that a surface of the vehicular seat becomes substantially flush with a reference plane of the compartment floor when the vehicular seat is placed into the storage recess.

15. A vehicular seat support mechanism comprising:
- a vehicular seat having a seat cushion that forms a sitting portion, the seat cushion having a pivot axis, which is horizontal with respect to the width direction of a vehicle, which enables the seat cushion to pivot in a fore-and-aft direction of a vehicle;
- a mechanism that moves the pivot axis of the seat cushion downward while the seat cushion pivots about the pivot axis; and
- a mounting bracket provided at a site in a compartment floor,
- wherein the mechanism includes a first link having a first end pivotally connected to the mounting bracket so that the first link is pivotal in a fore-and-aft direction relative to the mounting bracket, the first link having a second end pivotally connected to the rear-end portion of the seat cushion so that the first link is pivotal in the fore-and-aft direction relative to the seat cushion; and
- a second link having a first end pivotally connected adjacent to the rear-end of the mounting bracket so that the second link is pivotal in the fore-and-aft direction relative to the mounting bracket, the second link crossing the first link, the second link having a second end pivotally connected to a site in the rear end portion of the seat cushion that is forward of a site at which the second end of the first link is connected to the rear end portion of the seat cushion, so that the second link is pivotal in the fore-and-aft direction relative to the seat cushion.

16. A support mechanism according to claim 15, wherein the rear end portion of the vehicular seat is pivoted rearward and downward by a rearward pivoting motion of the first link and a rearward pivoting motion of the second link.

17. A support mechanism according to claim 15, wherein:
the vehicular seat includes a seatback that is disposed in association with the rear end portion of the seat cushion via a reclining mechanism; and
the vehicular seat is displaced into a state where the seatback is placed down over the seat cushion by pivoting the vehicular seat rearward.

18. A support mechanism according to claim 15, wherein:
the vehicular seat is a rear seat having a plurality of sitting portions that are arranged in a right-and-left direction; and
the mounting bracket is provided below the rearward portion of the seat cushion forming the rear seat, and the first link and the second link are connected to the mounting bracket.

19. A support mechanism according to claim 18, wherein there are a plurality of the mounting brackets and associated first and second links, and a first one of the mounting brackets and associated links is provided below a right-side portion of the rear end portion of the seat cushion, and a second one of the mounting brackets and associated links is provided below a left-side portion of the rear end portion of the seat cushion.

20. A vehicular seat support mechanism comprising:
a vehicular seat having a seat cushion that forms a sitting portion, the seat cushion having a pivot axis, which is horizontal with respect to a width direction of a vehicle, which enables the seat cushion to pivot in a fore-and-aft direction of a vehicle;
a support portion which supports the seat cushion on a floor of the vehicle, detachable to the floor;
a storage housing that is provided in the floor and accommodates the vehicular seat when the vehicular seat is placed into a storage position; and
a mechanism that moves the pivot axis of the seat cushion downward while the seat cushion pivots about the pivot axis, a lower support end portion of the mechanism being provided in the storage housing and being pivotal about a mounting pivot axis that is located substantially above a bottom surface of the storage housing.

21. A vehicular seat support mechanism according to claim 20, wherein the mechanism allows the seat cushion to invert such that a bottom surface of the seat cushion faces upward once the vehicular seat is placed into the storage position.

22. A vehicular seat support mechanism according to claim 20, wherein the mounting pivot axis is located above a vertical mid-point of the storage housing.

23. A vehicular seat support mechanism according to claim 20, wherein:
the pivot axis is a first pivot axis, and the seat cushion further includes a second pivot axis that is spaced from and parallel to the first pivot axis; and
the mechanism includes a first link pivotally connected to the first pivot axis and a second link pivotally connected to the second pivot axis.

* * * * *